United States Patent [19]
Dunn

[11] Patent Number: 5,284,370
[45] Date of Patent: Feb. 8, 1994

[54] GATE LATCH
[75] Inventor: James A. Dunn, Angola, Ind.
[73] Assignee: Vestil Manufacturing Company, Angola, Ind.
[21] Appl. No.: 1,034
[22] Filed: Jan. 6, 1993
[51] Int. Cl.⁵ .............................................. E05C 5/02
[52] U.S. Cl. ..................................... 292/68; 292/238; 292/213
[58] Field of Search ................... 292/6, 57, 59, 63, 67, 292/68, 213, 238

[56] References Cited
U.S. PATENT DOCUMENTS 2,666,660  1/1954  Youngworth .................... 292/68
3,774,947  11/1973  Duncan ............................ 292/68

Primary Examiner—Richard E. Moore
Attorney, Agent, or Firm—George Pappas

[57] ABSTRACT

A gate latch for selectively securing a pivoting gate to a stationary member and selectively retaining the gate in a closed position. The gate latch is formed of a hollow tube and is received on a vertical component of the gate. The hollow tube includes an elongate opening with a first width section and a second width section. The second width section is radially wider than the first width section. A horizontal component of the gate extends through the tube elongate opening and acts as a stop member for limiting both longitudinal and radial movement of the tube. A U-shaped bar is affixed to the hollow tube and forms two arms extending therefrom adapted for engaging the stationary member. The gate is retained closed by placing the stop member in the first width section and effectively preventing radial movement of the gate latch. The gate is selectively opened and closed by longitudinally sliding the hollow tube and locating the stop member in the second wider section of the tube opening and, thus, allowing greater radial movement of the tube and, also allowing the selective disengagement and engagement of the stationary member from inbetween the arms.

16 Claims, 3 Drawing Sheets

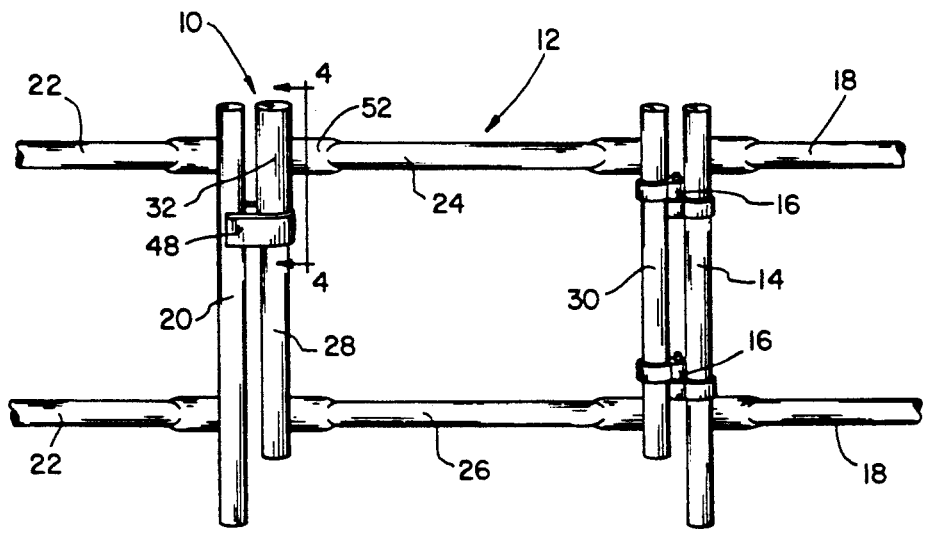
FIG. 1
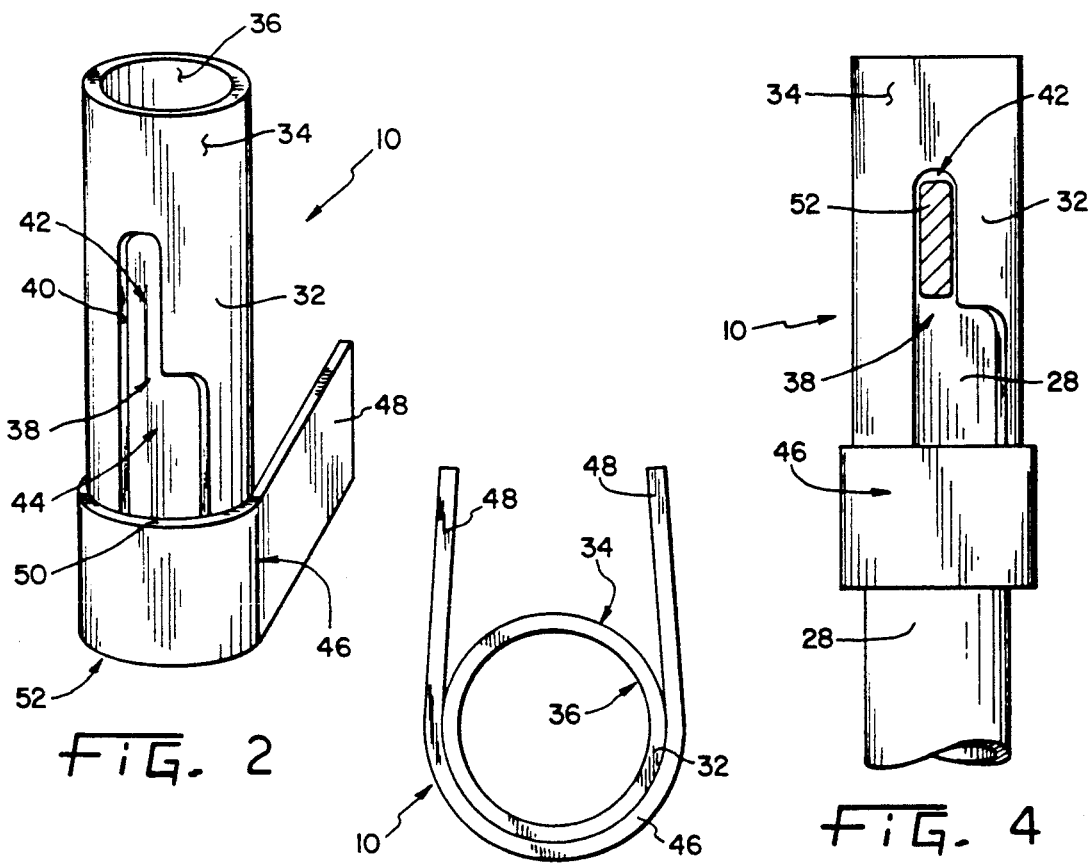
FIG. 2
FIG. 3
FIG. 4

GATE LATCH

TECHNICAL FIELD

The present invention relates to the technical field of gates and gate latches. More specifically, the present invention relates to a gate latch apparatus carried on a pivoting gate and which selectively secures the pivoting gate to a stationary member.

BACKGROUND OF THE INVENTION

Over the years, various gate latch mechanisms have been devised for the purpose of selectively closing and opening a gate. Examples of such mechanisms are shown in Beatty, U.S. Pat. No. 1,032,371; Reymann, U.S. patent No. 2,661,971; McCormack et al., U.S. Pat. No. 3,918,753; Kerr, U.S. Pat. No. 4,226,450; and, Norton, U.S. Pat. No. 4,512,105. All of these gate latch mechanisms function and accomplish the end result. However, they tend to be complex and generally time consuming and costly to manufacture. For example, Kerr, U.S. Pat. No. 4,226,450 and McCormack et al., U.S. Pat. No. 3,918,753 disclose gate latches which are functional but which incorporate many different components and which substantially increase production costs and, thus, the overall cost to the consumer. In addition, such gate latches have a greater tendency to fail due to the complexity and large number of components.

With respect to some prior gate latches, it is also possible to accidentally bump and/or otherwise inadvertently open the gate. As can be appreciated, this is undesirable, especially for example, with respect to gates on platforms which may be used for lifting people and/or other objects. It is also undesirable when the gate is used for holding back farm animals.

Accordingly, a need exists for a gate latch that positively secures a pivoting gate to a stationary member and which will not inadvertently easily be disengaged. In addition, a need exists for a gate latch which is generally easy and inexpensive to manufacture and which is reliable and long lasting.

SUMMARY OF THE INVENTION

It is the principal object of the present invention to overcome the above-discussed disadvantages associated with prior gate latch mechanisms.

The present invention overcomes the disadvantages associated with prior gate latches by providing a hollow tube on a vertical component or section of the gate. The tube is slidingly received on the vertical component and slides both longitudinally and radially thereon. The hollow tube further includes an elongate opening with a first section and a second section and wherein the second section width is larger than the first section width. A horizontal component of the gate extends through the elongate opening of the hollow tube and acts as a stop member for limiting both longitudinal and radial movement of the tube. By longitudinally moving the tube so that the stop member is either in the first or second width sections, the radial movement of the tube is varied. More specifically, when the stop member is in the first smaller width section, because the stop member is sized to be almost as wide as the width of the first section, the hollow tube is generally prevented from any radial movement. However, when slid longitudinally so that the stop member is in the second wider section, the tube is free to be moved radially a distance equal to the radial width of the second section less the thickness of the stop member.

A U-shaped bar is affixed to the hollow tube forming two arms extending from the tube which are adapted for selectively receiving a stationary member therebetween. Thus, when the stop member is within the first section of the elongate opening and the arms are engaged with the stationary member, the gate is in the latched position and is prevented from being opened. In addition, the first smaller in width section of the elongate opening is vertically above the second width section and the hollow tube and arms are normally gravitationally pulled downwardly and held in that position for retaining the gate locked. To open the gate, one merely slides the hollow tube upwardly against gravity and placing the stop member in the second wider section of the elongate opening thereby allowing radial movement of the tube and arms extending therefrom and thereby disengaging or pulling the arms away from the stationary member and opening the gate. To close the gate, the hollow tube is turned while the stop member is in the second wider section so that the gate may be pivoted toward the stationary member and so that the stationary member can be received inbetween the two extending arms. Once the stationary member is received between the two arms and the gate is placed in line with the stationary member, the tube is allowed to fall longitudinally downwardly placing the stop member in the first smaller width section whereby radial movement of the hollow tube is generally prevented. Accordingly, the gate is again retained secure to the stationary member.

In one form thereof, the present invention is directed to gate latch for securing a pivoting gate onto a stationary member. The gate latch includes a hollow tube slidingly received on an elongate shaft. The tube is adapted for both longitudinal and radial movement on the shaft. An opening is provided through the tube having a contact edge and having a first section with a first width and having a second section with a second width. The second section width is larger than the first section width. A stop member extends through the elongate opening and is adapted to contact the edge of the opening and to limit the longitudinal and radial movement of the hollow tube. The radial movement of the hollow tube is greater when the stop member contacts the edge of the second width section than when the stop member contacts the edge of the first width section. A means is provided extending from the hollow tube for selectively engaging the stationary member and retaining the gate closed when the stop member is located in the first section of the opening. The stationary member is selectively disengaged and the gate opened and closed by longitudinally sliding the hollow tube and locating the stop member in the second section of the opening.

Preferably, the hollow tube is cylindrically shaped and is received on a rod-shaped shaft. The stop member may be affixed to the shaft and extend out through the tube opening. The stop member may also be a horizontal component of the gate and the shaft can be a vertical component of the gate. Preferably, the hollow tube is generally vertically situated and the first width section is vertically above the second width section so that the hollow tube is longitudinally urged downwardly along the shaft and thus urging the first width section toward the stop member. The engaging means is also preferably a U-shaped bar received around and affixed to the hollow tube in a manner whereby the U-shaped bar forms two arms extending from the tube for selectively receiving the stationary member therebetween.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 1 is a front elevational view of the gate latch according to the present invention depicted on a pivoting gate and retaining the gate in a closed position;

FIG. 2 is a perspective view of the gate latch shown in FIG. 1 according to the present invention;

FIG. 3 is a top plan view of the gate latch shown in FIG. 2 according to the present invention;

FIG. 4 is a side elevational view of the gate latch and cross-section of the gate horizontal member taken along line 4—4 of FIG. 1;

Corresponding reference characters indicate corresponding parts throughout the several views of the drawings.

Figure 5:
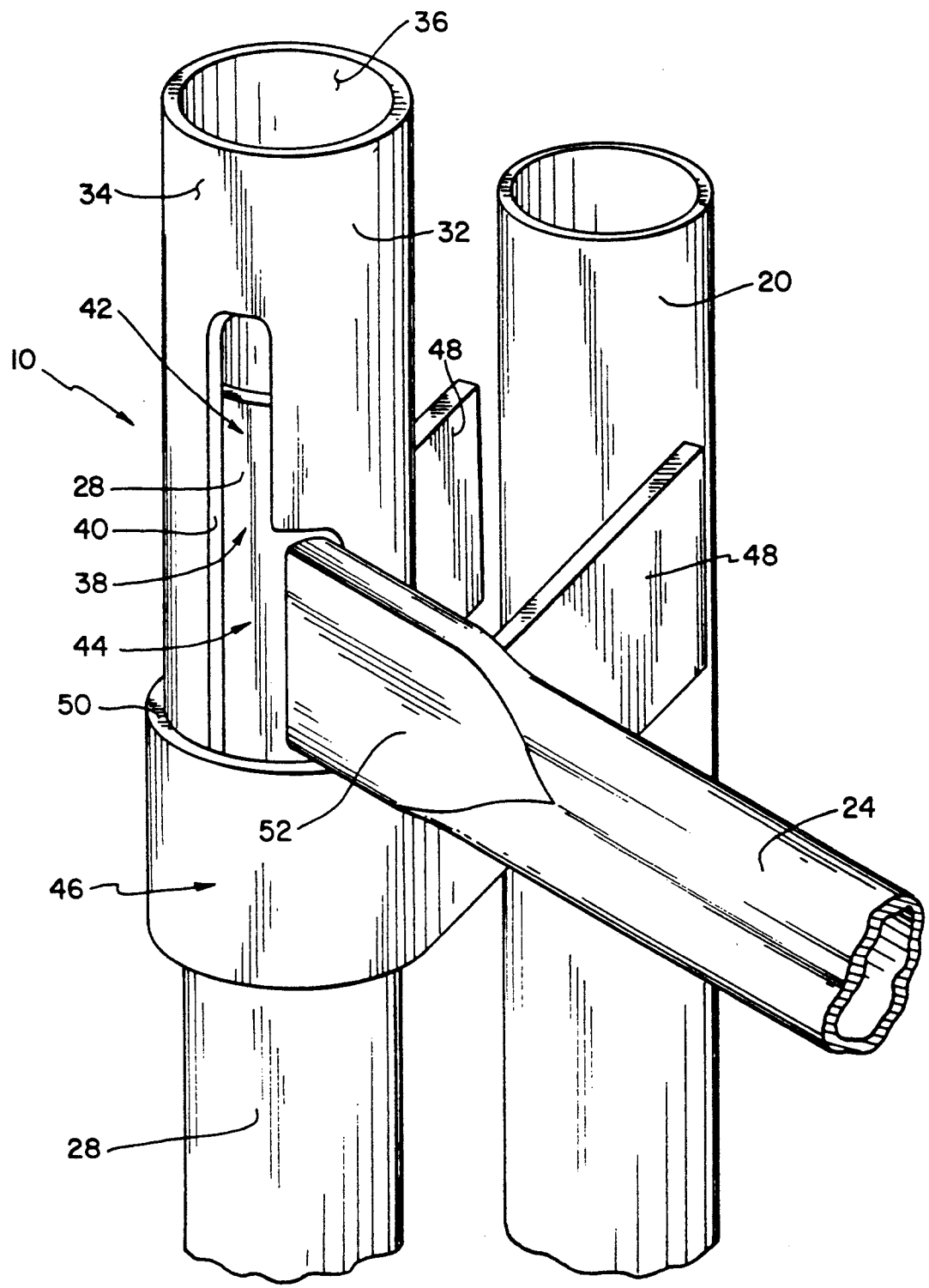
FIG. 5 is a perspective view of the gate latch shown in FIG. 1 according to the present invention and showing the gate latch radially turned and the gate pivoted for causing the gate to be opened or closed; and, FIG. 6 is a side elevational view of the gate latch and cross section of the gate horizontal member similar to FIG. 4 but also showing a radial opening for allowing the gate to be opened in both the left and right directions.

The exemplifications set out herein illustrate preferred embodiments of the invention in one form thereof and such exemplifications are not be construed as limiting the scope of the disclosure or the scope of the invention in any manner.

DETAILED DESCRIPTION OF THE SPECIFIC EMBODIMENT

Referring initially to FIG. 1, a gate latch generally referred by the numeral 10, is provided on a gate 12. Gate 12 is pivotally supported on vertical gate post 14 with hinges 16 or other suitable means. A fence or other wall may be formed beyond gate post 14 such as by horizontal fence members 18. In the fence embodiment depicted, horizontal fence members 18 are preferably welded to vertical gate post 14 and gate post 14 is affixed to the ground or other platform (not shown) as the case may be.

At the other end of gate 12, a second gate post 20 is affixed to the ground or a platform (not shown). A wall can also be formed on this side of the gate 12 by, for example, horizontal fence members 22 which may be welded or otherwise secured to gate post 20. Gate post 20, as more fully discussed hereinbelow, provides a stationary securement whereat the pivoting gate may be secured using gate latch 10 for retaining gate 12 in the closed position as shown in FIG. 1.

Gate 12, in the preferred embodiment as shown, includes upper horizontal member 24 and lower horizontal member 26 attached to vertical gate components 28 and 30. Horizontal members 24 and 26 are made of cylindrical pipe material and each end thereof is flattened and affixed to respective vertical gate components 28 and 30 by welding or other suitable means. Thus, members 24, 26, 28 and 30 form a rigid gate pivotally affixed to gate post 14 via hinges 16. It is noted that, as more fully discussed hereinbelow, vertical gate component 28 also acts as an elongate shaft whereupon gate latch 10 slides both longitudinally and radially and, further, horizontal member 24 acts as a stop for limiting this radial and longitudinal movement of the gate latch 10.

Gate latch 10 includes a hollow tube 32 which is generally cylindrical in shape with an outer wall 34 and an inner wall 36 defining the inside diameter thereof. An elongate opening 38 is cut into hollow tube 34 exposing an edge 40 in the wall thereof. Edge 40, as more fully discussed hereinbelow, is adapted for coming in contact with upper horizontal member 24 and limiting longitudinal and radial movement of gate latch 10. Opening 38 further defines a first section 42 with a first width and a second section 44 with a second width. As more clearly shown in FIGS. 2, 4, and 5, the second section width 44 is larger than the first section width 42 in the radial direction.

At one end of hollow tube 32 there is provided a U-shaped bar 46 which is received around and affixed to tube 32 by welding or other suitable means. U-shaped bar 46 forms two arms 48 which extend away from tube 32. The gap or width between arms 48, more clearly shown in FIG. 3, is adapted for snugly selectively receiving therebetween gate post 20. Upper edge 50 of U-shaped bar 46 also acts as a contact edge similar to edge 40 for, in this case, for coming in contact with horizontal member 24 and limiting longitudinal movement of gate latch 10. Further yet, because elongate opening 38 is actually formed by cutting hollow tube 32 up from end 52 thereof, U-shaped bar 46 also acts to support and make rigid end 52 of tube 32.

As mentioned hereinabove, horizontal member 24 extends through elongate opening 38 of hollow tube 32 and acts as a stop member for limiting radial and longitudinal movement of tube 32. More specifically, the flattened end 52 of horizontal member 24 extends through elongate opening 38 and is welded or affixed by other suitable means to vertical gate component 28. As more clearly shown in FIGS. 4 and 5, the width of flattened end 52 is slightly smaller than the first section 42 width and, thus, radial movement of gate latch 10 is generally prevented when flattened end 52 is within first section 42 as shown in FIG. 4. This is also depicted in FIG. 1 where arms 48 are shown engaging the stationary member or vertical gate post 20 and, thus, retaining the gate closed. It is also noted that the first width section 42 is situated vertically above the second width section 44 and, thus, gate latch 10 is gravitationally pulled or urged downwardly such that flattened end 52 is urged or pushed into first section 42. It is contemplated that other urging means, such as springs, can be incorporated for retaining flattened end 52 within section 42 during the closed mode and, under such circumstances, the first width section need not be vertically above the second width section. However, the embodiment as shown is preferred so as to limit complexity and manufacturing costs.

For opening the gate, the gate latch 10 is slid longitudinally upwardly upon vertical gate component 28 and, thus, placing flattened end 52 of horizontal member 24 within the second wider section 44 of opening 38. Because of the greater width of section 44, gate latch 10 can also now be radially turned a radial distance sufficient to allow gate 12 to be pivoted and opened as, for example, depicted in FIG. 5. In essence, this radial turning of latch 10 while end 52 is within the second wider section 44 allows the selective disengaging of gate post 20 from inbetween arms 48 and, thus, allows gate 12 to be pivoted about hinges 16.

The closing of gate 12 is accomplished by essentially the reverse process described above in opening the gate. In general, the gate latch 10 is again pushed against gravitational forces upwardly so that end 52 is within the second wider section 44 and so that hollow tube 32 and, thus, gate latch 10 may be radially turned about its longitudinal axis as shown in FIG. 5. Thereafter, gate 12 is pivoted so that vertical gate post 20 may be engaged inbetween arms 48 as shown in FIG. 1. This also causes flattened end 52 to become longitudinally aligned with first width section 42 so that gate latch 10 may slide downwardly causing end 52 to be received within first width section 42 and effectively locking gate 12.

Figure 6:
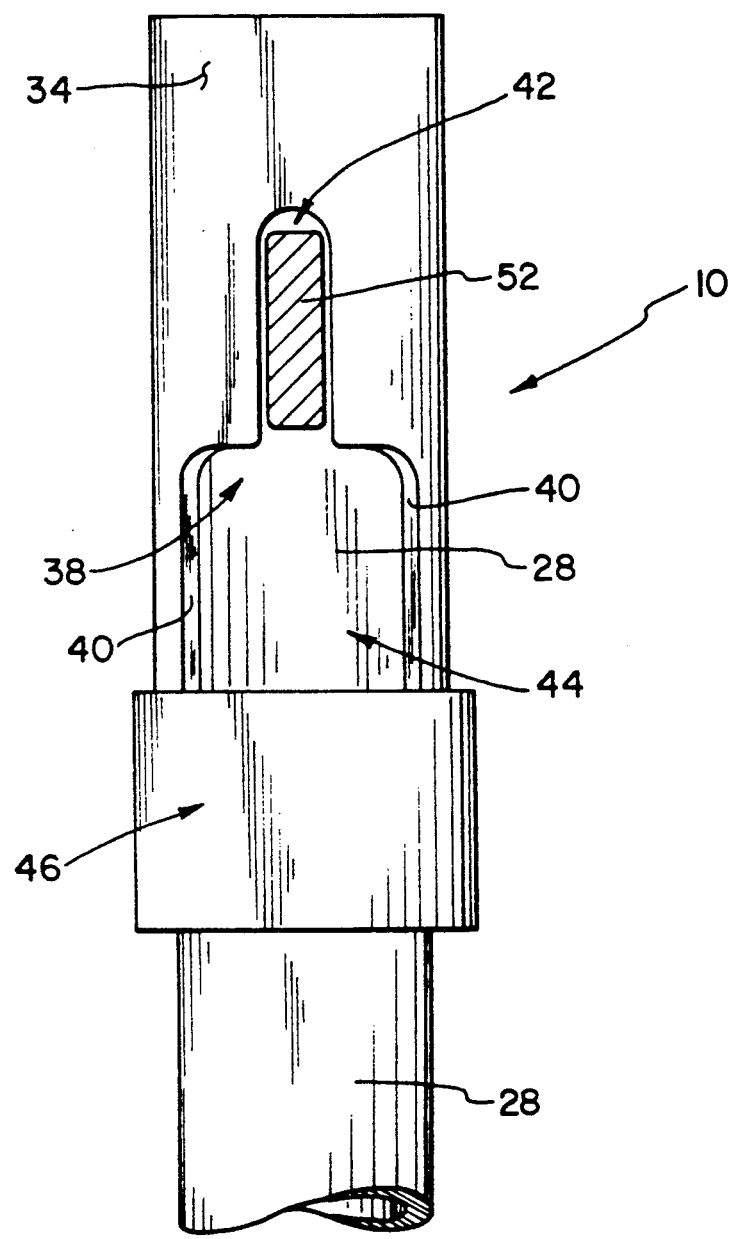

It is noted that elongate opening 38, as shown in FIGS. 2, 4 and 5 is provided with a second width section opening extending radially in one direction from below section 42. This allows gate 12 to be opened only to the left as viewed from the top. It is contemplated that, if the gate must be opened in both directions, the second width section 44 can be formed as shown in FIG. 6 so as to allow end 52 to travel both to the left and to the right of first section 42.

Although vertical gate component 28 is used for slidingly receiving hollow tube 32, it is contemplated that any shaft, preferably round or rod shaped, may be used and may be either on the pivoting gate or on gate post 20 or the fence formed therewith. Indeed, it is contemplated that gate latch 10 can be slidingly received on gate post 20 so that the upper horizontal fence member 22 acts as the stop member and so that arms 48 selectively engage and disengage vertical gate component 28 which would then be considered to be the "stationary member".

While the invention has been described as having specific embodiments, it will be understood that it is capable of further modification. This application is, therefore, intended to cover any variations, uses, or adaptations of the invention following the general principles thereof and including such departure from the present disclosure as come within known or customary practice in the art to which this invention pertains and fall within the limits of the appended claims.

What is claimed is:

1. A gate latch for securing a pivoting gate onto a stationary member, said gate latch comprising:
   a hollow tube slidingly received on an elongate shaft, said tube adapted for both longitudinal and radial movement on said shaft;
   an opening through said tube having a contact edge and having a first section with a first width and a second section with a second width, said second section width being larger than said first section width;
   a stop member extending through said elongate opening and adapted to contact said edge of said opening and limit said longitudinal and radial movement of said hollow tube, said radial movement of said hollow tube being greater when said stop member contacts said edge of said second width section than when said stop member contacts said edge of said first width section;
   means extending from said hollow tube for selectively engaging the stationary member and retaining the gate closed when said stop member is located in said first section of said opening and for selectively disengaging the stationary member and opening and closing the gate by longitudinally sliding said hollow tube and locating said stop member in said second section of said opening, and;
   wherein said means for engaging includes a U-shaped bar received around and affixed to said tube, said U-shaped bar forming two arms extending from said tube for selectively receiving the stationary member therebetween.

2. The gate latch of claim 1 wherein said hollow tube is cylindrically shaped and is received on a rod-shaped shaft.

3. The gate latch of claim 1 further comprising means for urging said hollow tube longitudinally along said shaft and said first width section towards said stop member.

4. The gate latch of claim 3 wherein said shaft and hollow tube are generally vertically situated and said first width section is vertically above said second width section, said longitudinal urging being substantially gravitational.

5. The gate latch of claim 1 wherein said stop member is affixed to said shaft.

6. The gate latch of claim 5 wherein said stop member is a horizontal component of the gate.

7. The gate latch of claim 1 wherein said stop member is a horizontal component of the gate.

8. The gate latch of claim 1 wherein said shaft is a vertical component of the gate.

9. The gate latch of claim 1 wherein said means for engaging includes two arms extending from said hollow tube, the stationary member selectively received between said two arms.

10. The gate latch of claim 1 wherein said stop member is a horizontal component of the gate and wherein said shaft is a vertical component of the gate.

11. A gate latch for securing a pivoting gate onto a stationary member, the gate made of a plurality of elongate components including a horizontal component affixed to a vertical component, said gate latch comprising:
    a hollow tube slidingly received on the gate vertical component and adapted for both longitudinal and radial movement thereon;
    an opening through said tube having a contact edge and having a first section with a first width and a second section with a second width, said second section width being larger than said first section width;
    the gate horizontal component extending through said elongate opening and adapted to contact said edge of said opening and limit said longitudinal and radial movement of said hollow tube, said radial movement of said hollow tube being greater when the gate horizontal component contacts said edge of said second width section than when the gate horizontal component contacts said edge of said first width section;
    means extending from said hollow tube for selectively engaging the stationary member and retaining the gate closed when the horizontal gate component is located in said first section of said opening and for selectively disengaging the stationary member and opening and closing the gate by longitudinally sliding said hollow tube and locating the horizontal gate component in said second section of said opening, and;

wherein said hollow tube is cylindrically-shaped and the gate vertical component is rod-shaped and further including means for urging said hollow tube longitudinally along the gate vertical component and said first width section towards the gate horizontal component.

12. The gate latch of claim 11 wherein said longitudinal urging is substantially gravitational.

13. The gate latch of claim 12 wherein said means for engaging includes two arms extending from said hollow tube, the stationary member selectively received between said two arms.

14. The gate latch of claim 12 wherein said means for engaging includes a U-shaped bar received around and affixed to said tube, said U-shaped bar forming two arms extending from said tube for selectively receiving the stationary member therebetween.

15. The gate latch of claim 11 wherein said means for engaging includes two arms extending from said hollow tube, the stationary member selectively received between said two arms.

16. The gate latch of claim 1 wherein said hollow tube is cylindrical shaped and said opening is cut into said tube from a tube end thereof, said U-shaped bar received around and affixed to said tube at said tube end, said U-shaped bar providing an upper edge for contacting said stop member and limiting longitudinal movement of said tube.

* * * * *